(12) United States Patent
Patton et al.

(10) Patent No.: US 7,231,067 B2
(45) Date of Patent: Jun. 12, 2007

(54) METHOD FOR PRINTING AND VERIFYING AUTHENTICATION DOCUMENTS

(75) Inventors: David L. Patton, Webster, NY (US); Allen K. Tsaur, Rochester, NY (US); Joseph A. DeAngelo, Mahwah, NJ (US); Aaron S. Waitz, Suffern, NJ (US)

(73) Assignee: Eastman Kodak Company, Rochester, NY (US)

( * ) Notice: Subject to any disclaimer, the term of this patent is extended or adjusted under 35 U.S.C. 154(b) by 38 days.

(21) Appl. No.: 11/017,398

(22) Filed: Dec. 20, 2004

(65) Prior Publication Data

US 2005/0116052 A1    Jun. 2, 2005

Related U.S. Application Data

(62) Division of application No. 09/558,117, filed on Apr. 25, 2000, now abandoned.

(51) Int. Cl.
*G06K 9/00* (2006.01)
*G06C 3/00* (2006.01)
*G06F 9/00* (2006.01)

(52) U.S. Cl. .................. 382/115; 380/54; 713/176; 358/3.28

(58) Field of Classification Search ............ None
See application file for complete search history.

(56) References Cited

U.S. PATENT DOCUMENTS 5,835,639 A    11/1998  Honsinger et al.
5,841,886 A *  11/1998  Rhoads ................ 382/115
5,859,920 A    1/1999   Daly et al.
5,905,819 A    5/1999   Daly
6,044,516 A    4/2000   Lev
6,345,104 B1 * 2/2002   Rhoads ................ 382/100
6,389,151 B1 * 5/2002   Carr et al. ............. 382/100

FOREIGN PATENT DOCUMENTS

EP            0459792      *  4/1991

* cited by examiner

*Primary Examiner*—Jingge Wu
*Assistant Examiner*—Charles Kim
(74) *Attorney, Agent, or Firm*—Frank Pincelli

(57) ABSTRACT

A system and method for printing images for use in an authentication document from a plurality of different printers and/or capture devices. Each of the plurality of different printers and/or capture device having a unique ID. The images are printed on an authentication document with the unique ID. The system provides for verification that the presenter of an authentication document. The unique ID and/or other information may be provided in a form that is not visible under normal viewing conditions. By canning the image the unique ID may be obtained and used for authentication. The obtained ID may be compared with a known information stored at a database for confirming that the presenter of the authentication document is the individual to whom it was issued.

12 Claims, 7 Drawing Sheets

METHOD FOR PRINTING AND VERIFYING AUTHENTICATION DOCUMENTS

CROSS REFERENCE TO RELATED APPLICATIONS

This is a divisional patent application of U.S. Ser. No. 09/558,117 filed Apr. 25, 2000 now abandoned.

FIELD OF THE INVENTION

This invention relates to the printing and verification of authentication documents such as passports, licenses and other official papers.

BACKGROUND OF THE INVENTION

To obtain a passport, the user submits two hardcopy images of themselves along with a proof of identity to the passport-issuing agency. If the user is not personally known to the acceptance agent, proof of identity is required. Proof of identity can be a previously issued passport, a commercially issued document such as a bearer document, a Certificate of Naturalization, a driver's license, or a Government Issue Identity card or pass. The user can send, via the U.S. Postal Service, the two hard copy images and proof of identity to the passport-issuing agency. In addition to proof of identity the passport-issuing agency requires proof of citizenship such as a certified birth certificate or previously issued passport. The reason for the proof of identity and proof of citizenship is to insure that the image on the passport is an authentic image of the person carrying the passport. By use of the term "authentic" it is meant that the image can indicate to a viewer or a reader with a high degree of certainty that the image has not been tampered with or changed. Digital technologies enable a user to capture and digitize a self-image for use on a passport. When the image is in the form of a hardcopy print or photographic negative, the image can be digitized by scanning the print or photographic negative to obtain image data which is then stored as an image file on a computer. The user's image can also be captured using a digital camera such as a KODAK DC290 Zoom Digital Camera or a KODAK Professional DCS 660 and then the image file can be loaded directly into a computer.

Digital printers such as KODAK PS 8650 Color Printer or a KODAK Photo Printer 4700 are capable of digitally printing an image from the stored image file. Prints produced using printers such as those listed above, have been deemed acceptable for use on passports. When an image is printed digitally, additional data can be encrypted into the image. The encryption is accomplished by using pixels in the image itself to encode specific information. This method of encrypting information is disclosed in U.S. Pat. No. 5,859,920 to Scott J. Daly et al, U.S. Pat. No. 5,905,819 to Scott J. Daly, U.S. Pat. No. 5,835,639 to Chris W. Honsinger et al, and in U.S. Pat. No. 6,044,516 to Chris W. Honsinger et al, Another method incorporating additional information into a digitally printed image is to print the added information using inks or dyes that are not visible or scannable under normal viewing conditions. These inks or dyes are viewable or capable of being scanned under special lighting conditions such as infrared or UV lights. Eastman Chemical Company under the trade name N.I.R.F. (near-infrared fluorophore) inks sells appropriate suitable ink for placement of the information.

Digital printing technologies allow images to be printed from digital files stored on servers. The passport image files can be downloaded to remote viewing locations on demand. Commonly assigned U.S. patent application Ser. No. 09/359,152, filed Jul. 22, 1999, entitled "Authorizing the Printing of Digital Images" by Patton et al describes a method for sending a digital image file to an authorizing agency.

A problem is that the methods currently used to produce passports do not provide a method for directly linking the image on the passport and the information on the passport. Currently there is nothing contained in the image such as a code or encrypted message to link the image to the passport. Hence, linking it to the person carrying the passport. Therefore it is possible to remove one image from the passport and replaced with a different image.

The present invention is directed to authentication document and a method for producing them, which overcome the problems of the prior art.

SUMMARY OF THE INVENTION

In accordance with one aspect of the present invention there is provided an authentication document comprising;

an image associated with the holder of the authentication document;

a first indicia placed in the image which is not visible under normal viewing conditions, the first indicia comprising a unique ID associated with the device used to print the image; and a second indicia comprising the unique ID associated with the image; and a third indicia comprising a unique ID associated with a printer used to print the image.

In accordance with another aspect of the present invention there is provided an authentication document comprising a first image thereon, the image having an indicia which is not visible under normal viewing conditions, the indicia capable of confirming the appropriate person to which to the document has been issued.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention.

It is understood that elements not specifically shown or described may take various forms well known to those skilled in the art.

Figure 1:
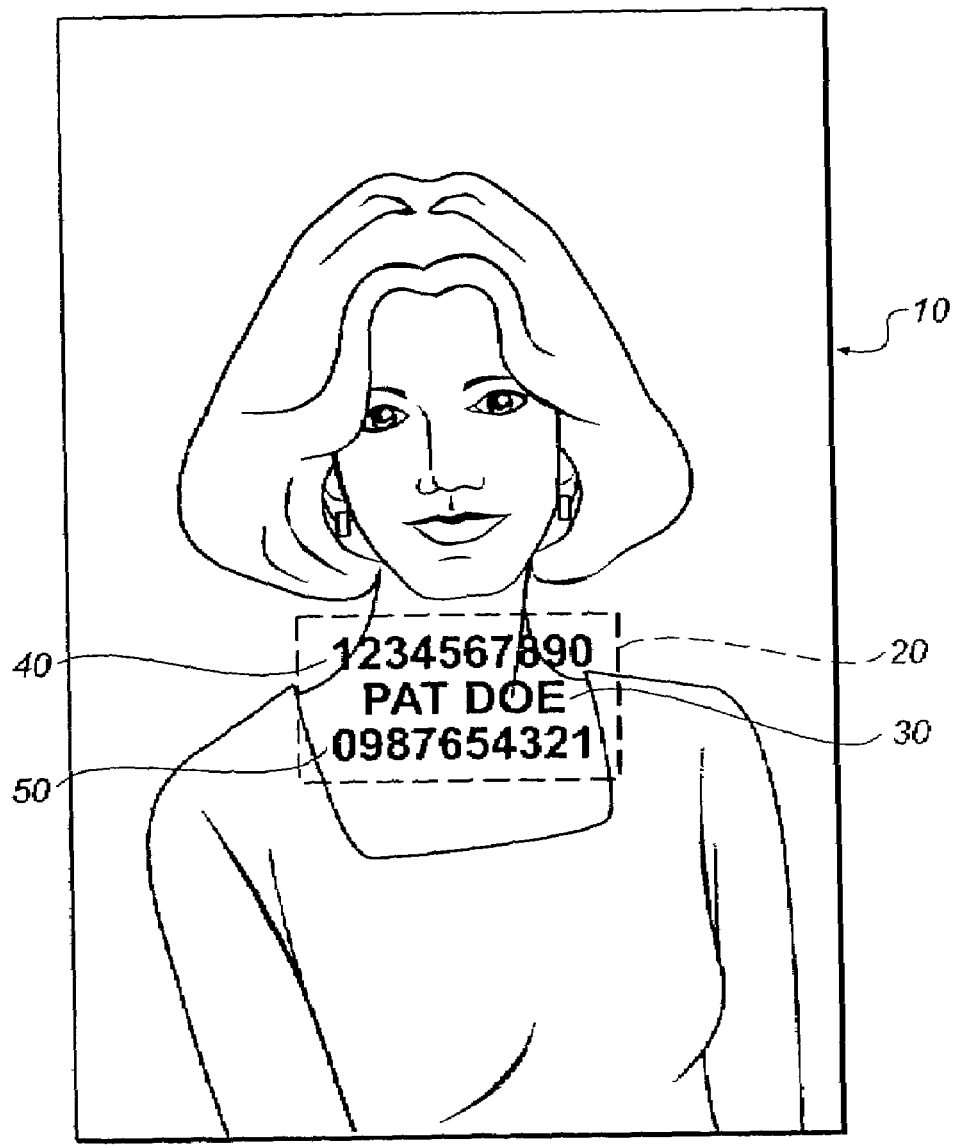
FIG. 1 is a plan view of a hardcopy print made in accordance with the present invention.

Now referring to FIG. 1 there is illustrated a plan view of a hardcopy print 10 (such as a photograph) made in accordance with the present invention for use in verifying passports and other authentication documents. In the embodiment, the print 10 has an indicia area 20 including a first invisible indicia 30 in the form of a name. The name identifies the person in the print 10. The indicia area 20 includes second invisible machine-readable indicia 40 in the form of a document identification number such as the passport number linked to the name in indicia 30. The first and second indices 30 and 40 respectively confirm that the person in the print 10 is the person belonging to the passport or document. The print 10 has a third indicia in the indicia area 40 consisting of a unique identification number 50.

Figure 2:
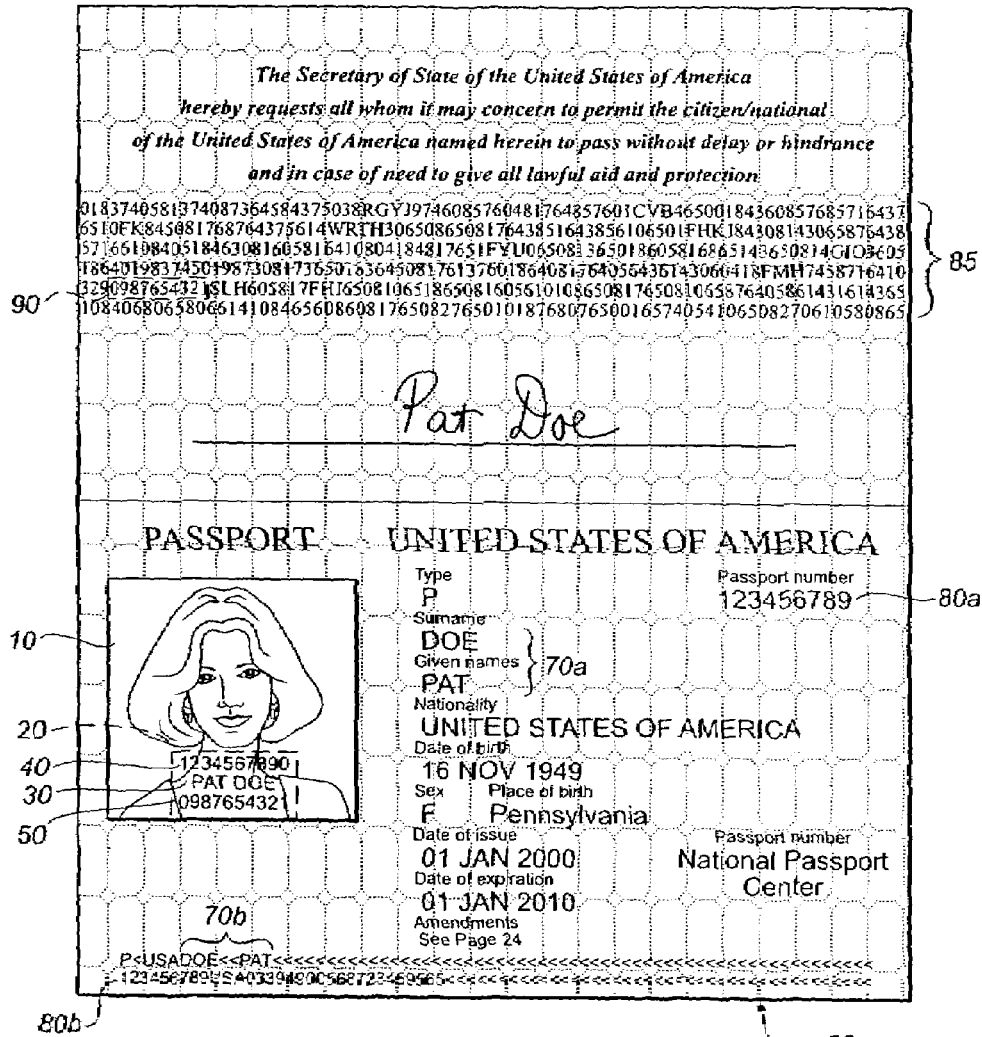
FIG. 2 is a plan view of a passport made in accordance with the present invention.

Now referring to FIG. 2 there is illustrated a plan view of an authentication document 60 made in accordance with the present invention. In the embodiment illustrated the authentication document is a passport issued by a governmental authority to an individual. Print 10 appearing on the passport 60 is linked to the name 70a and 70b printed on the authentication document 60 by the information contained in the indicia area 20. The information including a first, second and third invisible indices 30, 40, and 50 respectively ensure the print 10 used is an authentic image of the person to which the passport 60 was issued. The identification number 40 may be the passport number 80a and 80b printed on the authentication document 60. The unique identification number 50 may be printed somewhere on the passport in a field of numbers 85 in a manner that is not discernable without knowing the number's exact location. The exact location of the identification number 50 maybe contained in the identification number 50 itself. The box 90 illustrates the location of the identification number 50 in the number field 80.

Figure 3:
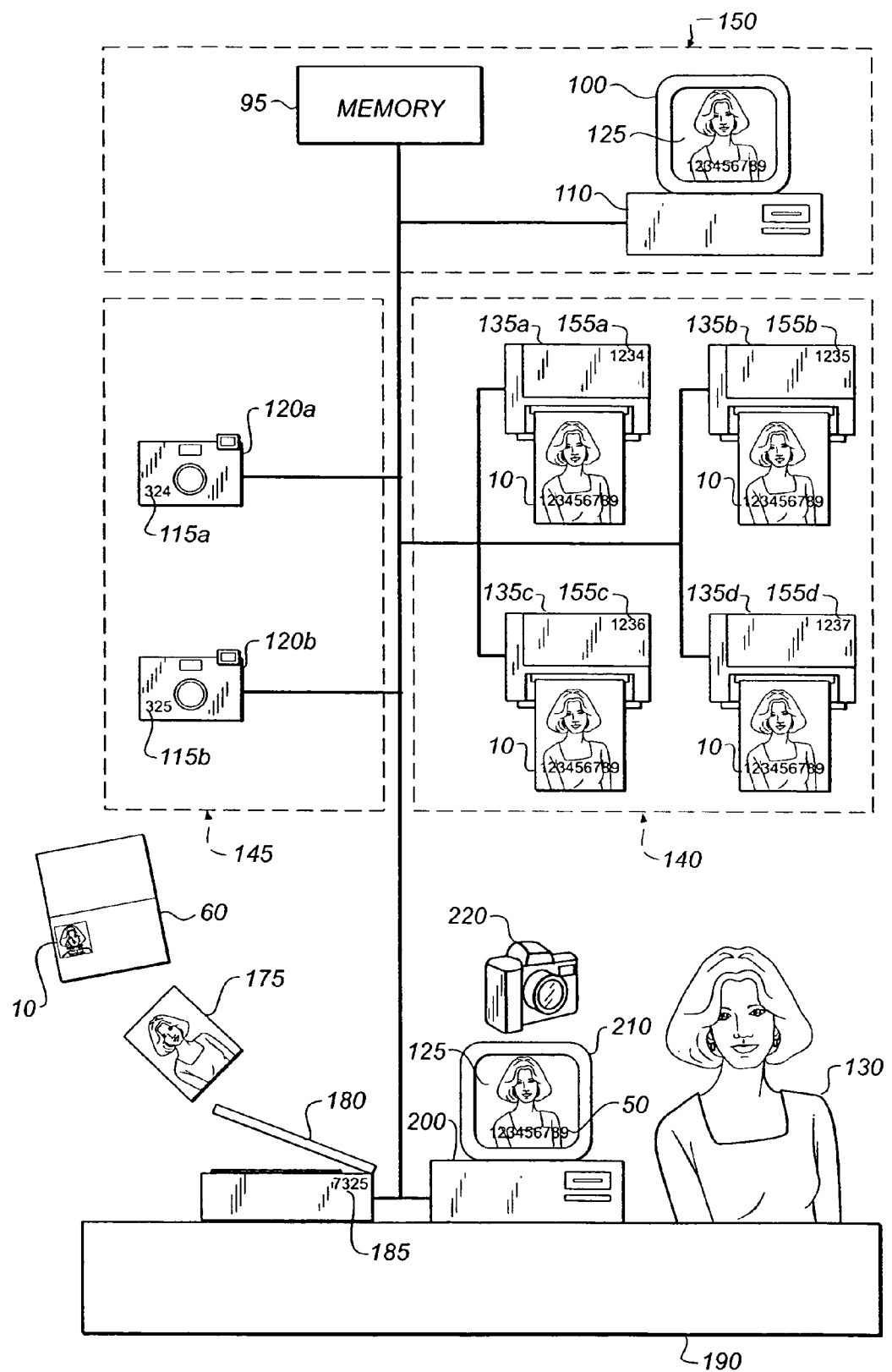
FIG. 3 is a schematic diagram of a system for printing and verifying of passports and other authentic documents.

Referring to FIG. 3, there is illustrated a schematic diagram of a system for printing and verifying of authentication documents such as a passport made in accordance with the present invention. A unique identification number 50 placed on the authentication document can be used to identify a camera 120a or 120b or any other image capture device used to capture an image 125 of a person 130. The cameras 120a and 120b each have their own unique identification numbers 115a and 115b respectively which can be linked through an algorithm to each image that is captured using the specific camera. The unique identification number 50 may also be used to identify a printer 135a, 135b, 135c, and 135d used to produce the hardcopy print 10. The printers 135a, 135b, 135c, and 135d each have their own unique identification number 155a, 155b, 155c, 155d respectively which can be linked through an algorithm to each print that is printed using the specific printer. The unique identification number 50 may also be used to identify the remote location 145 and 140 where the image 125 was captured or the print 10 was printed respectively. The unique identification number 50 may further be used to identify the combination of the camera 120a used to take the image, the printer 135a used to produce the print and the camera's and printer's locations. The camera 120a may be located at a location different from the printer 135a or at the same location. The unique identification number 50 may further be used to identify the person 130, the camera 120a used to take the image, the printer 135a used and their location. The first, second and third indices 30, 40 and 50 respectively located in the indicia area 20 are not capable of being scanned for reproduction by digital scanners. In printing the indices 30, 40 and 50 inks are used that is not capable of being scanned as disclosed in U.S. Pat. No. 5,919,730 to Gasper et al, but are capable of being read under special viewing conditions.

The image 125 of the person 130 is captured at a first remote location 145 by the camera 120a. The digital image 125 of the person 130 and associated verifying information, document identification number 40 and unique identification number 50 is sent via a communications link 160 such as the Internet to a central location 150. The digital image 125 of the person 130 along with the associated verifying information, document identification number 40 and unique identification number 50 is stored in digital format in memory 95 on a server 110. The associated verifying information is comprised of but not limited to proof of identity and the image can be viewed on a monitor 100 at the central location 150. It may be desirable upon receiving the digital image file with it's associated data to combine the different identification numbers into one new identification number using an algorithm running on the server 110. The algorithm can combine or modify the document identification number 40 and unique identification numbers for the camera, printer and their locations to create a new unique identification which can be linked to the stored image 125.

In the case where the person 130 submits a previously printed hardcopy image 175 of themselves for use in the authentication documents, such as passports and other similar authentic documents, the hardcopy image 175 is scanned using a digital scanner 180. The digital scanner is capable of reading encrypted information and/or data that printed with inks not visible under normal viewing conditions as discussed above. The digital image 125 of the person 130 and encoded data that has been read is sent via the communications link 160 to a central location 150 where the image 125 along with the associated verifying information are stored in digital format on a server 110. As in the case where a camera is used to capture the image the scanner 180 as well as its location can have a unique identification number 185 which can be linked to the digital image 125. The scanned digital image 125 can be viewed on a monitor 100 at the central location 150.

When the person 130 uses the passport 60, at a remote location 190, the document identification number 40 is electronically transmitted as signals from a computer 200 at the remote location 190 to the server 110 at the central location 150 over the communication channel 160. The document identification number 40 identifies the digital image file of the person 130. The document identification number 40 also indicates where the file is located on the server 110 at the central location 150. The image 125 of the person 130 and associated verifying information is displayed on a monitor 100 at the central location 150. The digital image 125 can be transmitted from the central location 150 to the remote location 190 over the communications channel 160 (such as a phone line, secure communications link, or the internet) to the computer 200 where the digital image 125 is displayed on a monitor 210. The image 125 can be compared directly to the person 130 using the passport 60 at the remote location 190.

The system of FIG. 3 can be operated in a number of another ways in accordance with the present. For example, the passport 60 of the person 130 is scanned at the remote location 190 on the scanner 180. The scanned image, document identification number 40 and unique identification number 50 which is not visible under normal viewing conditions are electronically transmitted as signals from a computer 200 at the remote location 190 to the server 110 at the central location 150 over the communication channel 160. The document identification number 40 identifies the digital image file of the person 130 and where the file is located on the server 110 at the central location 150. The image 125 of the person 130 and associated verifying information is displayed on a monitor 100 at the central location 150 and is compared to the transmitted image. A message is sent to the remote location 190 indicating whether or not the picture 10 that is on the passport matches the digital image 125 stored on the server 110 at the central location 150.

In yet another method operation of the system of FIG. 3 the passport's unique identification number 50, which is not visible under normal viewing condition, is transmitted from the central location 150 to the remote location 190. The transmitted identification is compared to the unique identification number 50 encoded on the passport 60. When the passport 60 is scanned using the scanner 180 at the remote location 190, the unique identification number 50 is displayed via the computer 200 on the monitor 210. The scanner 180 has it's own unique identification number 185. The methods described in the above embodiments may be used to verify the identity of the person using the passport 60 or other authentication document such as a credit card, title, deed, ID card, lease, bond, certificate of deposit, bank account books, etc.

In the method of operating the system of FIG. 3 the digital image of the person is captured at the remote location 190 using a digital camera 220. The digital camera 220 is linked directly to the computer 200. To verify the identity of the person 130 the captured digital image 125 is transmitted along with the unique identification number 50 from the remote location 190 to the central location 150 where it is compared to the image stored on the server 110. One example is a person using a credit card. The image of the person using the credit card is captured at the remote location and sent with the credit card number to the central location where the image filed with the credit card number being used is compared to the captured image. The unique identification number can be but is not limited to a passport number, driver's license number, credit card number, airplane ticket number, school or college ID number, social security number, etc.

Figure 4:
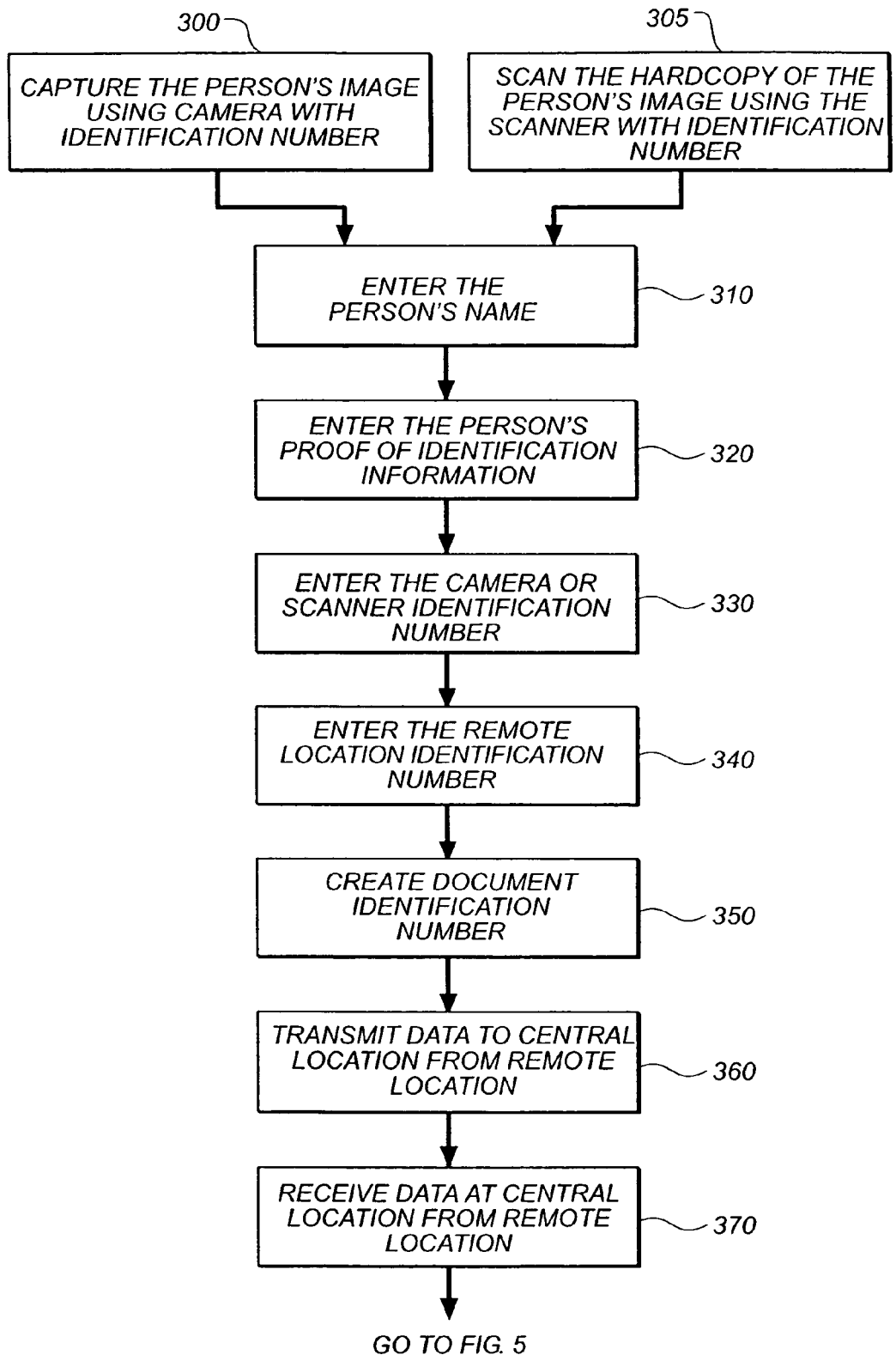
FIGS. 4 and 5 together illustrate a flowchart of a system for capturing a passport image.
Figure 5:
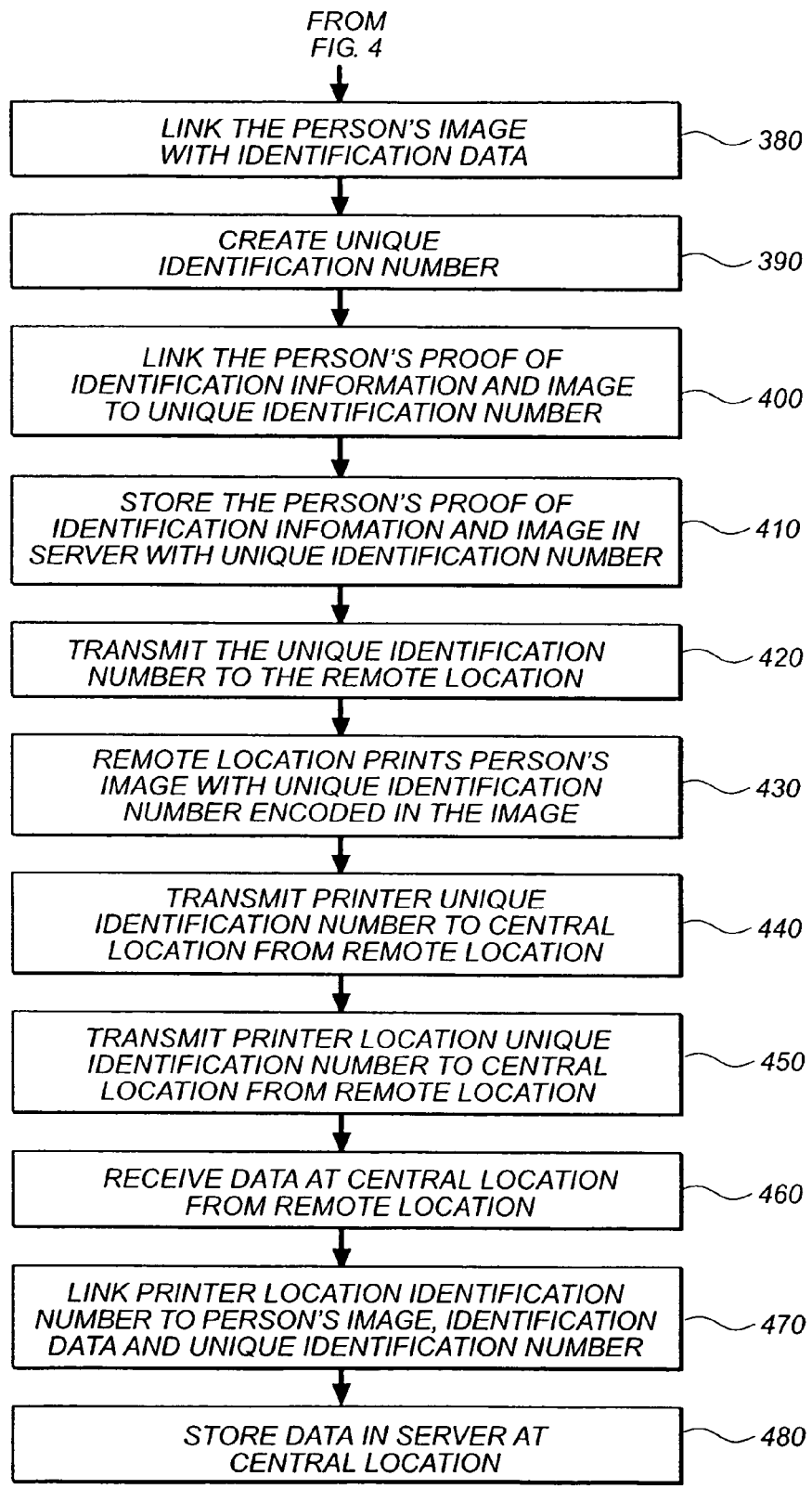

Now referring to both FIGS. 4 and 5 there is illustrated a flow chart of a system for capturing an image for an authentic document in accordance with the present invention. Starting with FIG. 4, the person 130 goes to a remote location 145 to have their image captured for use on a passport 60 or other authentication document as shown in block 300. The user's image 125 is captured digitally. In the embodiment illustrated the image is captured using the digital camera 120a or 120b (such as a KODAK DC290 Zoom Digital Camera or a KODAK Professional DCS 660) having a unique identification number. The person's name and proof of identification are entered into the server's (database) 110 as shown in 310 and 320 respectively. The identification number of camera 120a or 120b respectively that is recorded is entered as shown in block 330. The unique identification number for the remote location 145 of the cameras is entered as shown in block 340. The unique document identification number 40 is created as shown in block 350 and the data is transmitted to the central location 150 as shown in block 360. The data transmitted from the remote location 145 at step 370 is received at the central location 150.

Now flowing to FIG. 5 which flows from FIG. 4, the computer 110 at the central location 150 links the person's image 125 with all the identification data as shown in block 380. The algorithm running on the computer 110 at the central location 150 creates a new unique identification number 50 and links the proof of identification and image 125 to the unique identification number 50 as shown in blocks 390 and 400 respectively. The proof of identification image 125 and the unique identification number 50 are stored in the server 110 at the central location 150 as shown in block 410. The image 125, the unique document identification number 40 and the unique identification number 50 are transmitted to the remote printing location 140 as shown in block 420. The remote location 140 prints the image 125 with the unique document identification number 40 and the unique identification number 50 on to an image to be part of or formed on an authentication document as shown in block 430. The authentication document is forwarded to the owner to whom it is issued. The remote location 140 transmits the unique printer number of the printer that was used to print the image 155a, 155b, 155c, or 155d and the printer location number to the central location 150 as shown in blocks 440 and 450 respectively. The data from the remote printing location 140 is received at the central location 150 as shown in block 460. The server 110 at the central location 150 links the printer and location numbers to the person's image 125 and other data and stores all the unique identification numbers, image 125 and proof of identity in the server 110 as shown in blocks 470 and 480 respectively.

Referring back to FIG. 4, rather than using a camera 120a or 120b to capture the image, the person 130 can submit a previously captured hardcopy print 175 of himself or herself for scanning at the remote location 190 as shown in block 305. The scanned image 125 and the proof of identification flows through the same steps as the camera 120a, captured image. In the case of the scanner each scanner 180 has it's own unique identification number 185.

Figure 6:
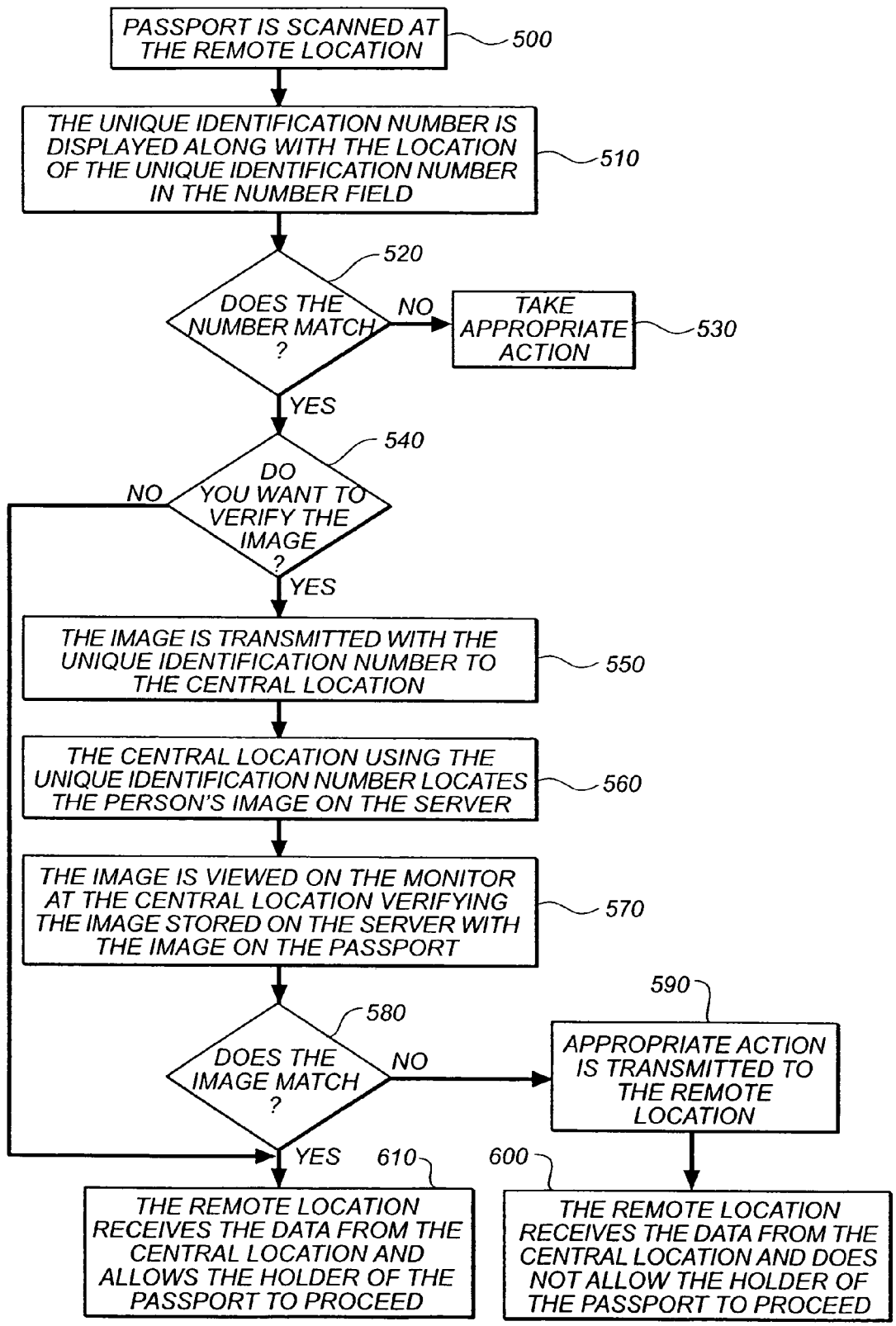
FIG. 6 illustrates a flow chart of a system for verifying a passport image.

Now referring to FIG. 6, there is illustrated a flow chart of a system for verifying an authentication document. The authentication document 60 is presented at a remote location 190 where the authentication documentation 60 is scanned on a scanner 180 as shown in block 500. The unique identification number 50 is displayed as part of the image 125 on the monitor 210 along with the location of the unique identification number 50 in the field of numbers 85 on the authentication document 60 as shown in block 510. The operator at the remote location 190 compares the unique identification 50 displayed on the monitor 210 against the number indicated by the box 90 in the number field 85 as shown by the decision block 520. If the numbers match, the remote location 190 allows the person 130 holding the authentication document 60 to pass as shown in block 610. If the numbers do not match, the appropriate action is taken as shown in block 530. If the numbers do match, the operator may or may not decide to verify the image 10 on the passport 60 as shown in decision block 540. If the operator decides not to verify the image 10 on the passport 60, the operator allows the person 130 holding the passport 60 to pass as shown in block 610. If the operator decides to verify the image 10 on the passport 60, the scanned image 125 at the remote location 190 is transmitted with it's unique identification number 50 to the central location 150 as shown in block 550. At the central location 150 the unique identification number 50 is used to retrieve the image 125 linked to that specific unique identification number 50 from the server 110 as shown in block 560. The transmitted image and retrieved image are viewed on the monitor 100 and compared as shown in block 570. If the images do not match as shown by decision block 580, the data and appropriate action to be taken is transmitted to the remote location 190 as shown in block 590. The remote location 190 receives the data and appropriate action is taken. For example, the person 130 holding the passport 60 is not allowed to pass as shown in block 600. If the images match, the remote location 190 receives the data from the central location 150 and allows the person, 130 holding the authentication document 60 to pass as shown in block 610.

Figure 7:
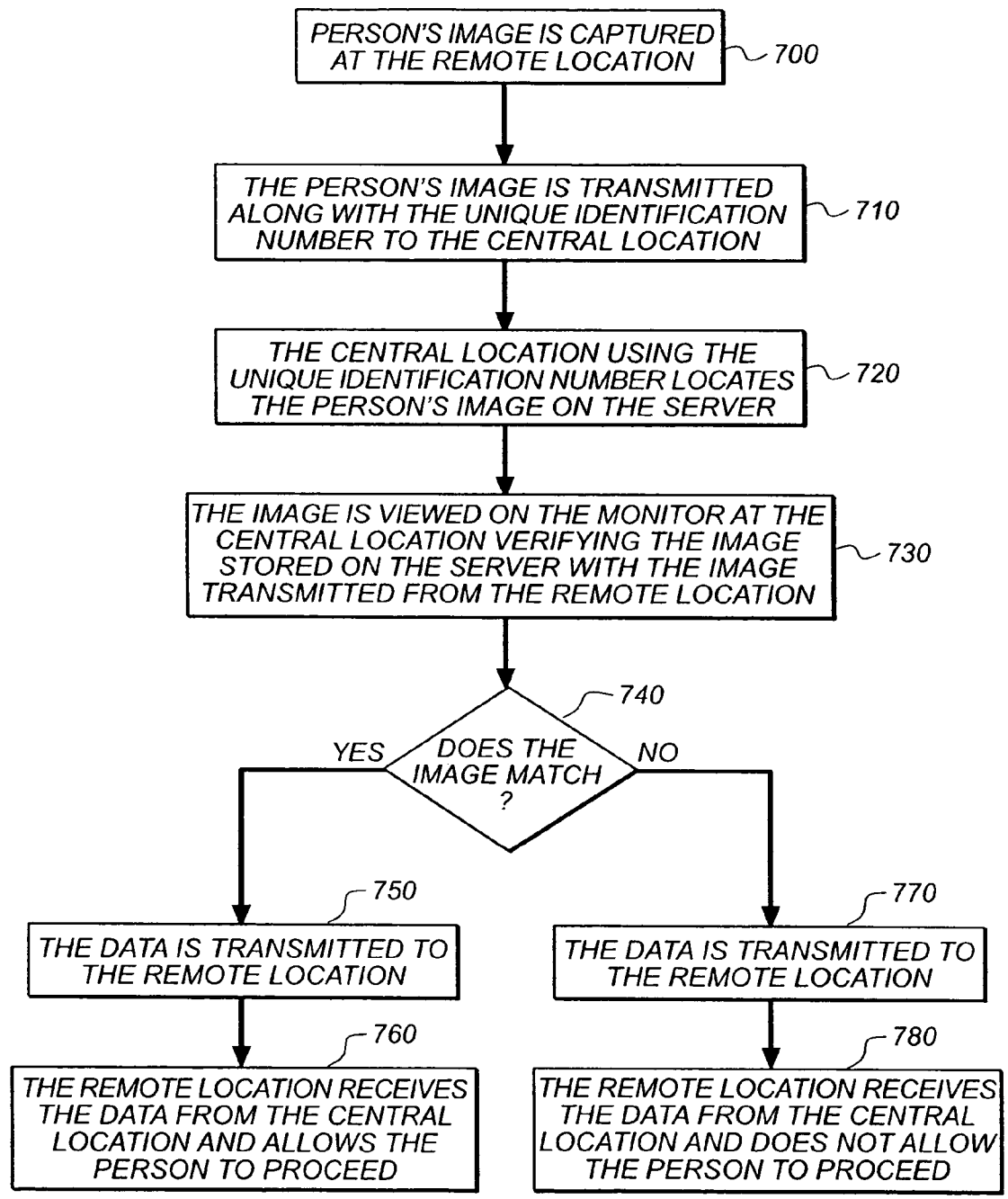
FIG. 7 illustrates a flow chart of a system for verifying an image of a person.

Now referring to FIG. 7, FIG. 7 illustrates a flow chart of a system for verifying an image of a person. The digital image 125 of the person 130 is captured at the remote location 190 using, for example, a digital camera 220 as shown in block 700. To verify the identity of the person 130 the captured digital image 125 is transmitted along with the unique identification number 50 from the remote location 190 to the central location 150 as shown in block 710. The central location 150 using the unique identification number 50 locates and retrieves the person's image 125 stored or the server 110 as shown by block 720.

The retrieved image 125 is displayed on a monitor 125 where it is compared to the transmitted image 175 as shown in block 730. If the images match as indicated by decision block 740, the data is transmitted to the remote location 190 as shown in block 750 and the person 130 is allowed to proceed with their action or transaction as shown by block 760. If the images do not match as indicated by decision block 740, the data is transmitted to the remote location 190 as shown in block 770 and the person 130 is not allowed to proceed with their action or transaction as shown by block 780.

While the image can be printed on a hard copy paper, which is then made a part of the authentication document, the image may be printed directly on the authentication document. By recording the date at the time the image 125 is captured and storing the capture date with the image 125 or as part of the image file on the server 110, the image 125 may be download and printed on time sensitive authentication documents. Examples of a time sensitive authentication documents are a driver's license, passports, national identification cards, etc. The ability to download the user's image and print it directly on the time sensitive authentication document would eliminate the need for the user to go into the DMV or passport office to renew the driver's license or passport.

The invention has been described in detail with particular reference to certain preferred embodiments thereof, but it will be understood that variations and modifications can be effected within the scope of the present invention, the present invention being defined by the following claims.

PARTS LIST 10 hardcopy print
20 indicia area
30 first indicia
40 document identification number
50 unique identification number
60 passport
70*a* name
70*b* name
80*a* passport number
80*b* passport number
85 number field
90 box
95 memory
100 monitor
110 server
115*a* and *b* camera identification number
120*a* and *b* camera
125 digital image
130 person
135*a, b, c*, printer
140 remote location
145 remote location
150 central location
155*a, b, c, d* unique printer identification numbers
160 communications link
175 hardcopy image
180 scanner
185 scanner unique identification number
190 remote location
200 computer
210 monitor
220 digital camera
300 block
305 block
310 block
320 block
330 block
340 block
350 block
360 block
370 block
380 block
390 block
400 block
410 block
420 block
430 block
440 block
450 block
460 block
470 block
480 block
500 block
510 block
520 decision block
530 block
540 decision block
550 block
560 block
570 block
580 decision block
590 block
600 block
610 block
700 block
710 block
720 block
730 block
740 decision block
750 block
760 block
770 block
780 block

What is claimed is:

1. An authentication document comprising:
   an image associated with the holder of said authentication document;
   a first indicia placed in said image which is not visible under normal viewing conditions, said first indicia identifying the person in the image; and
   a second indicia placed in said image which is not visible under normal viewing conditions comprising a document identification number; and a third indicia placed in said image which is not visible under normal viewing conditions comprising a unique ID, said third indicia comprising:
the identity of the person in the image;
the identity of an image capture device;
the identity of an image printing device; and
the location of each.

2. The authentication document of claim 1, wherein the first indicia being the name of the person in the image.

3. The authentication document of claim 1, wherein the second indicia is a document identification number.

4. The authentication document of claim 3, wherein the document identification number is machine readable.

5. The authentication document of claim 1, wherein the second indicia is a passport number.

6. The authentication document of claim 1, wherein the second indicia is a credit card number.

7. The authentication document of claim 1, wherein the third indicia is machine-readable.

8. The authentication document of claim 1, wherein the third indicia identifies an image capture device.

9. The authentication document of claim 1, wherein the third indicia identifies an image printing device.

10. The authentication document of claim 1, wherein the third indicia identifies a location where the image was captured.

11. The authentication document of claim 1, wherein the third indicia identifies a location where the image was printed.

12. The authentication document of claim 1, wherein the third indicia identifies the person in the image.

* * * * *